United States Patent [19]

Billings et al.

[11] Patent Number: 4,745,388

[45] Date of Patent: May 17, 1988

[54] TRANSFORMER WITH WIRE LEAD ISOLATION SLOTS

[75] Inventors: Robert L. Billings, Andover, Mass.; Robert C. Cooper, Newton, N.H.

[73] Assignee: American Telephone and Telegraph Company, AT&T Bell Laboratories, Murray Hill, N.J.

[21] Appl. No.: 9,772

[22] Filed: Feb. 2, 1987

[51] Int. Cl.[4] .............................................. A01F 15/10

[52] U.S. Cl. ....................................... 336/192; 336/83

[58] Field of Search ................. 336/83, 192, 198, 208; 242/118.4

[56] References Cited

U.S. PATENT DOCUMENTS

| | | | |
|---|---|---|---|
| 3,083,930 | 4/1963 | Brekke | 336/198 X |
| 3,117,294 | 1/1964 | Muszynski et al. | 336/208 X |
| 3,328,736 | 6/1967 | Keck | 336/192 |
| 3,457,534 | 7/1969 | Davis | 336/192 |
| 3,792,398 | 2/1974 | Norlin et al. | 336/192 |
| 3,939,362 | 2/1976 | Grimes et al. | 336/192 |
| 4,086,553 | 4/1978 | Robandt et al. | 336/192 |
| 4,157,519 | 6/1979 | Foster | 336/192 |
| 4,427,962 | 1/1984 | Liberman | 336/208 X |
| 4,588,973 | 5/1986 | Girah et al. | 336/208 X |

FOREIGN PATENT DOCUMENTS

| | | | |
|---|---|---|---|
| 2004344 | 8/1971 | Fed. Rep. of Germany | 336/192 |
| 2700524 | 7/1978 | Fed. Rep. of Germany | 336/192 |
| 3320530 | 12/1984 | Fed. Rep. of Germany | 336/192 |

OTHER PUBLICATIONS

"TDK Ferrite Cores—2 Data Book No. D LE 857-0021", p. 172, dated Jul. 1985.

"TDK Ferrite Cores—2 Date Book No. D LE 857-0021", p. 399, dated Jul. 1985.

P. 67 of "Engineered Bobbins" published by Plastron Corp. on Oct. 29, 1984.

P. 51 of "Bobbins" published by Kinematrix.

P. 40 of "Cosmo Catalog and Design Manual" published by Cosmo.

*Primary Examiner*—Thomas J. Kozma

*Attorney, Agent, or Firm*—Volker R. Ulbrich; Harry L. Newman

[57] ABSTRACT

A transformer (10) for mounting on a printed wire board includes a bobbin (14) held between two ferrite core slabs (12). The bobbin is wound with a primary winding (28) having a secondary winding (32) wound over it. The wire leads (30) of the primary winding lie in slots (26) in one of the flanges (20) of the bobbin which extend to terminals (24) of a terminal base (22) integral with the flange to isolate them from the secondary windings and leads (34).

2 Claims, 1 Drawing Sheet

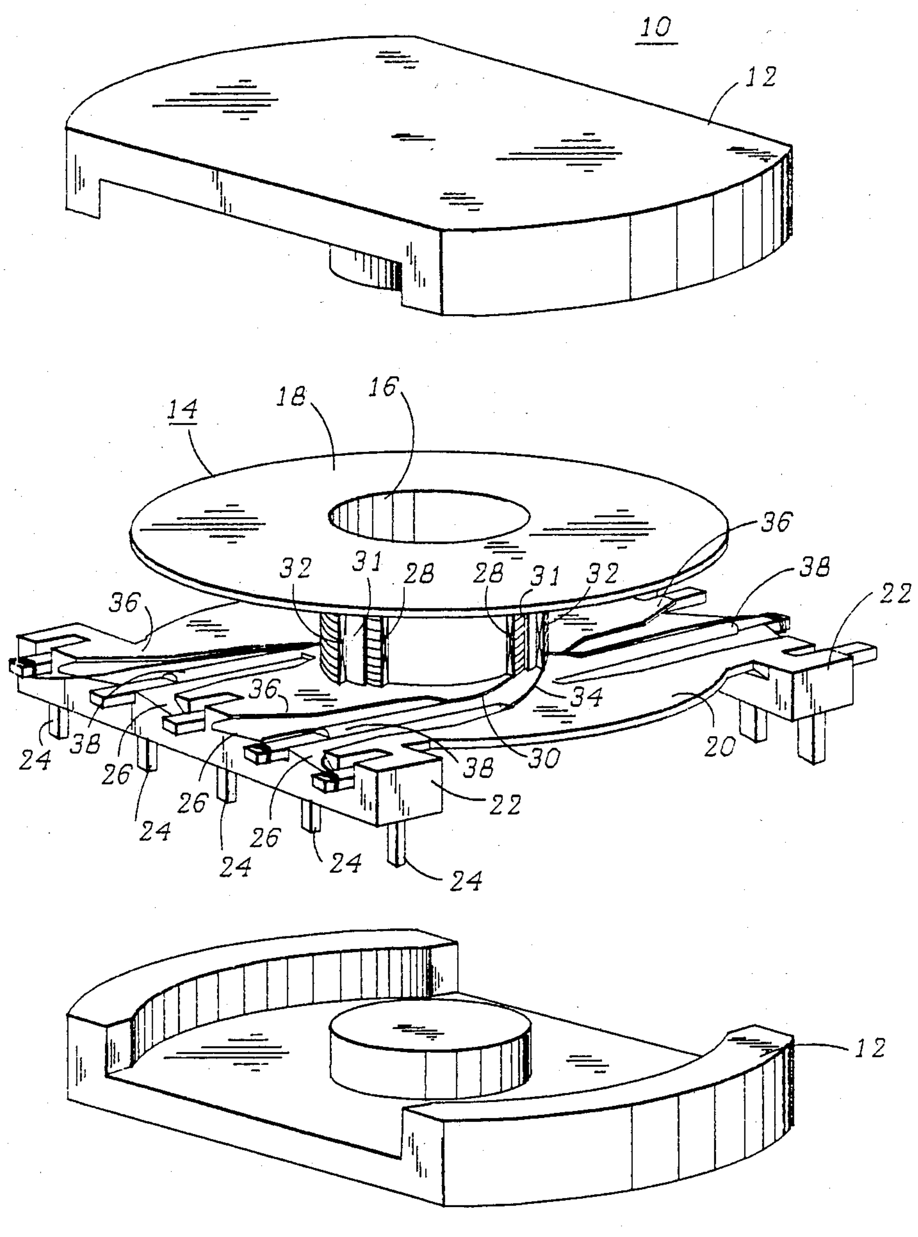
10
12
14
18
16
36
32
31
28
28
31
32
38
22
36
38
26
36
34
20
24
38
30
22
26
24
26
24
24
24
12

TRANSFORMER WITH WIRE LEAD ISOLATION SLOTS

TECHNICAL FIELD

The invention relates to transformers of the type which are mounted on printed circuit boards.

BACKGROUND OF THE INVENTION

Electronic circuits often require a transformer for direct current isolation, voltage conversion, or as a filter element. These transformers generally are formed by a magnetic core member and a bobbin member, although the core member is not essential. Around the bobbin there are wound one or more windings. One winding would be sufficient to form an inductance element. Two or more windings as the primary and secondary result in a transformer. The voltage difference between the primary and secondary windings can be relatively large, more than a thousand volts. Therefore, it is important that the wire leads of the primary winding be well insulated from those of any secondary winding. To this end, it is the present practice to first fasten the lead wires of the primary winding to terminals and to hold them against the inside surface of the flange of the bobbin with adhesive backed insulating tape before beginning the process of forming the secondary winding. This keeps the leads out of the way of the winding process and provides extra insulation between the leads and the turns of the secondary, which would otherwise press directly against the lead wires at the flange.

The winding and terminating process is done automatically. The taping process, however, is done manually, and is a significant aspect of the total labor content of the transformer. Moreover, the taped leads of the first winding tend to get somewhat in the way of the winding process for the second winding, which is also carried out automatically. Further, it is not readily feasible to tape the leads close enough to the wire termination to provide the desired isolation of the first winding lead from the winding turns of the second winding, which end up in contact with it.

SUMMARY OF THE INVENTION

In accordance with the present invention, the flange of a transformer bobbin is provided with slots in which the winding leads lie. The slots have ledges which overhang the wire lying therein. The leads are thereby completely insulated from other winding leads without the need for taping. Furthermore, they are kept from interfering with the winding of the secondary winding by being entirely removed from the space between the bobbin flanges in which the winding operation takes place.

BRIEF DESCRIPTION OF THE DRAWING

The drawing shows an elevated perspective exploded view of a transformer in accordance with one embodiment of the invention.

DETAILED DESCRIPTION

The transformer 10 shown in the drawing is an assembly of two matching ferrite core sections 12, each identical to the other, and an insulating plastic spool, or bobbin assemby 14. The bobbin assembly 14 includes a hub 15, an upper flange 18, and a terminal flange 20, all in the form of a single, integral molded part. The terminal flange 20 extends out to a pair of terminal bases 22, each of which has a plurality of copper-alloy terminals 24 embedded in it. The inner face of the terminal flange 20 is provided with a number of wire lead slots 26 which each extend from near the hub 16 to a terminal 24 in a direction generally parallel to a tangent line to the hub 16 midway between the terminal bases 22.

A primary winding 28, partially shown, is wound around the hub 16. End leads 30 of the primary winding 28 lie within the slots 26 and are wound around the terminals 24. The outer perimeter surface of the primary winding 28 is covered with a layer of tape 31 to separate it from a secondary winding 32 which is wound over it. The secondary winding leads 34 are also fastened to terminals 24. Since there is only one secondary winding 32 present in this particular transformer 10, the secondary winding leads 34 need not lie in slots 26 for isolation. However, additional slots 26 are provided for an assembly in which yet another secondary winding is wound over the first secondary winding 32 to similarly isolate its winding leads from the windings of the first secondary winding.

Each of the slots 26 features a ledge 36 projecting from near the upper corner of one sidewall and overhanging the deepest portion of the slot 26 for providing additional electrical insulation and mechanical protection for the wire leads lying thereunder. The ledges 36 have a generally wedge-shaped cross-section, with decreasing width remote from the wall. The slots 26 flare out in width as they approach the terminals 24, with the projecting distance of the ledges 36 becoming correspondingly greater as they approach the terminals 24. Several ribs 38 extend between the terminal bases 22 adjacent two slots 26 for reinforcement of the terminal flange 20 where they are weakened by the presence of the slots 26. The ribs also prevent the winding turns, which are under considerable compression forces, from being forced into the opening of the slots 26.

In order for the slots 26 to be aligned with the wire as it extends under tension from its winding, the radial thickness, or "pile-up" of the winding must be taken into consideration. Therefore, each of the slots 26 should extend in a direction generally tangent to a circle concentric to the hub 16 and passing through the inner end of the slot 26 near the hub 16. The difference between the radius of the hub 16 and the radius of the concentric circle will ideally be the thickness of the combined thickness of any windings at the point where the wire lead leaves the winding. While it is preferred that the slots 26 extend in a straight line to a terminal 24, bends are permitted for whatever purpose they may serve, but sharp bends may pose problems for automated assembly processes. Similar considerations with regard to the alignment of of leads with a slot as they extend from the hub under tension would apply to bobbins which have a hub with a generally rectangular or other cross-sectiion configuration instead of a round one. In a most general sense it might be said that the slots should extend in a direction tangential to the radius of curvature of the winding at the point where the lead leaves it.

While the transformer 10 described above includes core members 12, such members are not necessary for the transformer to function as such.

What is claimed is:

1. In combination, an electrically insulating bobbin and at least one winding supported on the bobbin comprising:

a hub about which turns of the winding are wound;

a pair of spaced opposed flanges between which the hub extends, the flanges having facing surfaces and one of the flanges having a pair of slots in its facing surface for respectively accommodating lead wires of the winding, the slots extending from the vicinity of the hub to an outer edge of the one flange, and the one flange having a ledge projecting over each slot for insulating the lead wires positioned within the slots from turns wound about the hub, and the one flange further having a plurality of ribs protruding from the facing surface of the one flange into the space between the opposed flanges otherwise occupied by turns wound about the hub, the ribs being respectively positioned adjacent to the pair of slots and serving to prevent turns wound about the hub from moving into the slots.

2. An electrically insulating bobbin comprising:

a hub adapted to have turns of an electrical winding wound thereabout;

a pair of spaced opposed flanges between which the hub extends, the flanges having facing surfaces and one of the flanges having a pair of slots in its facing surface for respectively accommodating lead wires of a winding wound about the hub, the slots extending from the vicinity of the hub to an outer edge of the one flange, and the one flange having a ledge projecting over each slot for insulating lead wires positioned within the slots from turns wound about the hub, and the one flange further having a plurality of ribs protruding from the facing surfaces of the one flange into the space between the opposed flanges otherwise occupied by turns wound about the hub, the ribs being respectively positioned adjacent to the pair of slots and serving to prevent turns wound about the hub from moving into the slots.

* * * * *